US010465376B1

(12) United States Patent
Hoberman

(10) Patent No.: US 10,465,376 B1
(45) Date of Patent: Nov. 5, 2019

(54) CONSTRUCTION METHOD FOR FOLDABLE POLYHEDRAL ENCLOSURES

(71) Applicant: Charles Hoberman, New York, NY (US)

(72) Inventor: Charles Hoberman, New York, NY (US)

( * ) Notice: Subject to any disclaimer, the term of this patent is extended or adjusted under 35 U.S.C. 154(b) by 0 days.

(21) Appl. No.: 15/633,921

(22) Filed: Jun. 27, 2017

Related U.S. Application Data

(60) Provisional application No. 62/355,483, filed on Jun. 28, 2016.

(51) Int. Cl.
| | |
|---|---|
| *E04B 1/35* | (2006.01) |
| *E04B 1/32* | (2006.01) |
| *E04B 1/344* | (2006.01) |
| *E04B 1/348* | (2006.01) |
| *E04B 1/343* | (2006.01) |
| *E04B 1/00* | (2006.01) |

(52) U.S. Cl.
CPC ........ *E04B 1/3445* (2013.01); *E04B 1/34336* (2013.01); *E04B 1/34815* (2013.01); *E04B 1/35* (2013.01); *E04B 1/32* (2013.01); *E04B 2001/0053* (2013.01); *E04B 2001/327* (2013.01)

(58) Field of Classification Search
CPC .. E04B 1/3211; E04B 1/32; E04B 2001/3217; E04B 2001/327; E04B 2001/3276; E04B 1/3445; E04B 1/34815; E04B 2001/0053; E04B 1/34336; E04B 1/35

USPC .............. 52/81.1, 81.4, 81.6, 80.1
See application file for complete search history.

(56) References Cited

U.S. PATENT DOCUMENTS

| | | | | |
|---|---|---|---|---|
| 1,997,022 | A * | 4/1935 | Stalker | A63F 9/088 229/116 |
| 2,934,075 | A * | 4/1960 | Richardson | E04H 15/20 156/156 |
| 2,979,064 | A * | 4/1961 | Fischer | E04H 15/20 135/115 |
| 3,640,034 | A * | 2/1972 | Shotwell, Jr. | E04B 1/3211 52/70 |
| 3,729,876 | A * | 5/1973 | Kolozsvary | E04B 1/34378 52/394 |
| 3,854,255 | A * | 12/1974 | Baker | E04B 1/3211 52/81.1 |
| 4,227,334 | A * | 10/1980 | Hooker | A63H 33/16 428/542.8 |
| 4,309,852 | A * | 1/1982 | Stolpin | A63H 33/04 446/116 |

(Continued)

*Primary Examiner* — Phi D A
(74) *Attorney, Agent, or Firm* — Gottlieb, Rackman & Reisman, P.C.

(57) ABSTRACT

A foldable structure comprised of hinged panel segments is provided. These segments are comprised of a first panel pair comprised of a first and second polygonal panel, and a second panel pair comprised of a third and fourth polygonal panel. Segments are bounded by a first boundary plane defined by two sides of the first panel pair, and a second boundary plane defined by two sides of the second panel pair, Measurement of a boundary angle may be taken normal to the intersection of the first and second boundary planes. As the segment is continuously folded between a first position and a second position, said boundary angle remains substantially constant during folding.

9 Claims, 11 Drawing Sheets

(56) References Cited

U.S. PATENT DOCUMENTS

| | | | | |
|---|---|---|---|---|
| 4,425,740 A * | 1/1984 | Golden | E04B 1/3211 16/225 |
| 4,651,478 A * | 3/1987 | Dahl | E04B 1/3211 52/2.15 |
| 4,780,344 A | 10/1988 | Hoberman | |
| 4,807,405 A * | 2/1989 | Borgquist | E04B 1/3211 52/2.18 |
| 4,942,700 A | 7/1990 | Hoberman | |
| 4,981,732 A | 1/1991 | Hoberman | |
| 5,024,031 A | 6/1991 | Hoberman | |
| 5,165,207 A * | 11/1992 | Oehlke | E04B 1/3211 403/244 |
| 5,234,727 A | 8/1993 | Hoberman | |
| 5,505,025 A * | 4/1996 | Fleishman | A45B 23/00 52/648.1 |
| 5,540,013 A * | 7/1996 | Diamond | E04B 1/32 52/646 |
| 6,070,373 A * | 6/2000 | Diamond | E04B 1/19 52/81.1 |
| 6,082,056 A * | 7/2000 | Hoberman | A63F 9/088 52/109 |
| 6,190,231 B1 | 2/2001 | Hoberman | |
| 6,219,974 B1 | 4/2001 | Hoberman | |
| 6,282,849 B1 * | 9/2001 | Tuczek | E04B 1/32 52/648.1 |
| 6,739,098 B2 | 5/2004 | Hoberman | |
| 6,834,465 B2 * | 12/2004 | Hoberman | E04B 1/3441 52/3 |
| 7,100,333 B2 | 9/2006 | Hoberman | |
| 7,118,442 B2 | 10/2006 | Laliberte et al. | |
| 7,125,015 B2 | 10/2006 | Hoberman | |
| 7,464,503 B2 | 12/2008 | Hoberman | |
| 7,559,174 B2 | 7/2009 | Hoberman | |
| 7,584,777 B2 | 9/2009 | Hoberman | |
| 7,644,721 B2 | 1/2010 | Hoberman | |
| 7,794,019 B2 | 9/2010 | Hoberman | |
| 7,948,425 B2 | 5/2011 | Bernhardt et al. | |
| 8,615,970 B2 | 12/2013 | Hoberman | |
| 2003/0213186 A1 * | 11/2003 | Geiger | E04B 1/3211 52/81.3 |
| 2004/0031208 A1 * | 2/2004 | Visser | E04B 1/3211 52/2.17 |
| 2008/0066393 A1 * | 3/2008 | Sorensen | A63H 33/101 52/81.1 |
| 2010/0058676 A1 * | 3/2010 | Roberts | E02B 3/04 52/81.1 |
| 2010/0077674 A1 * | 4/2010 | Johnson | B64G 1/646 52/81.1 |

* cited by examiner

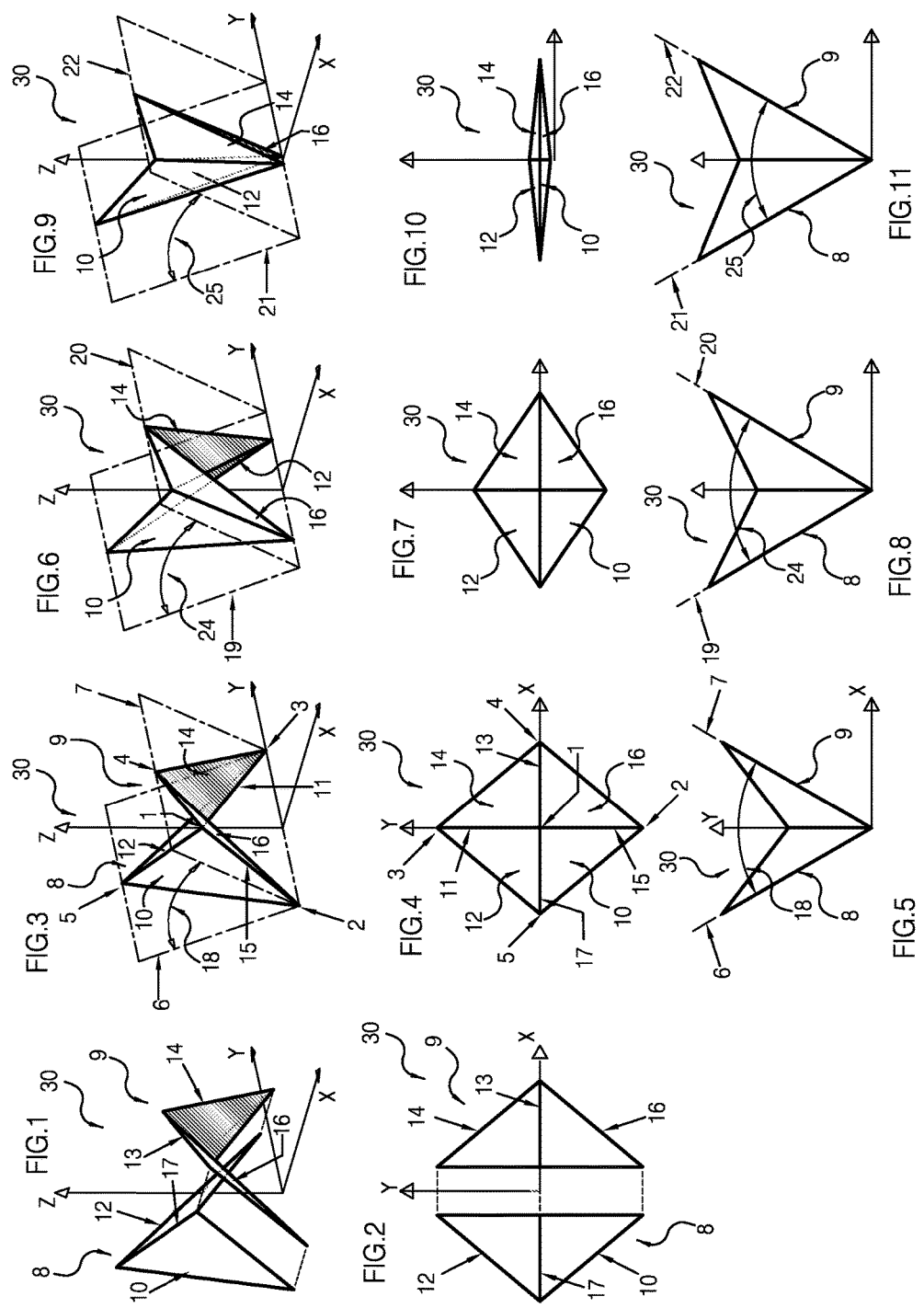

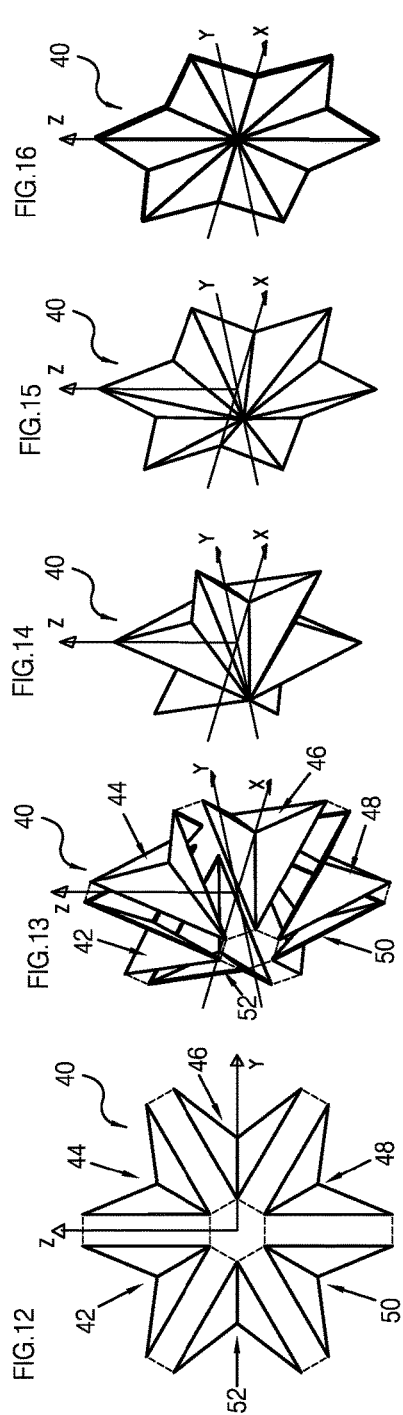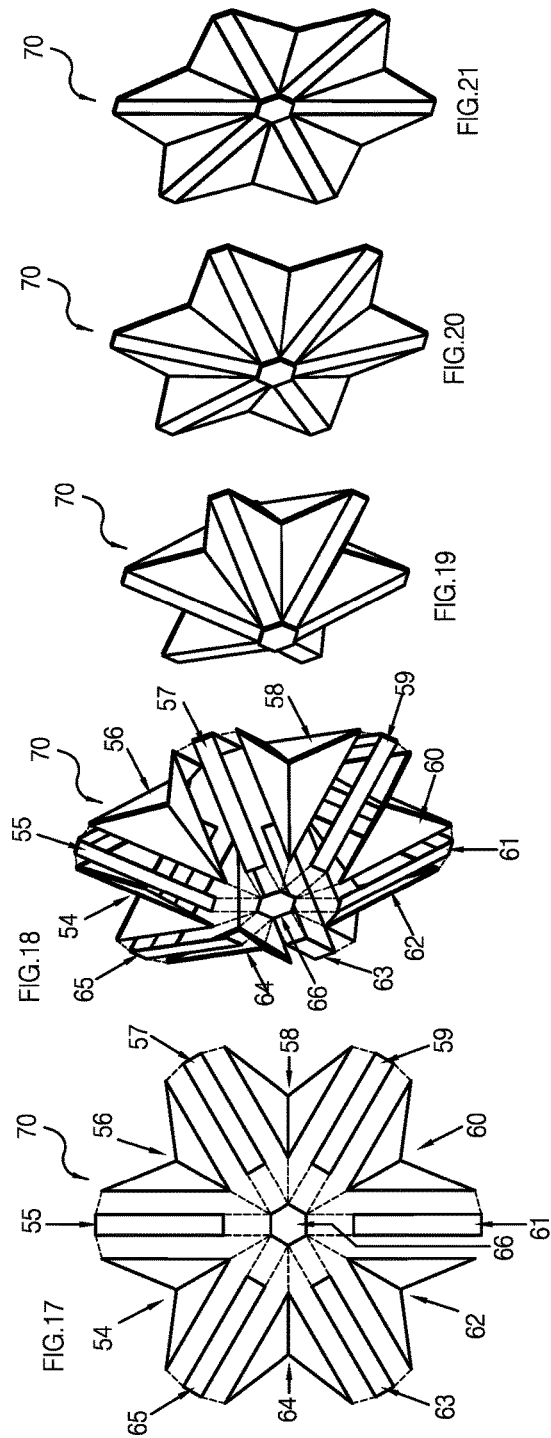

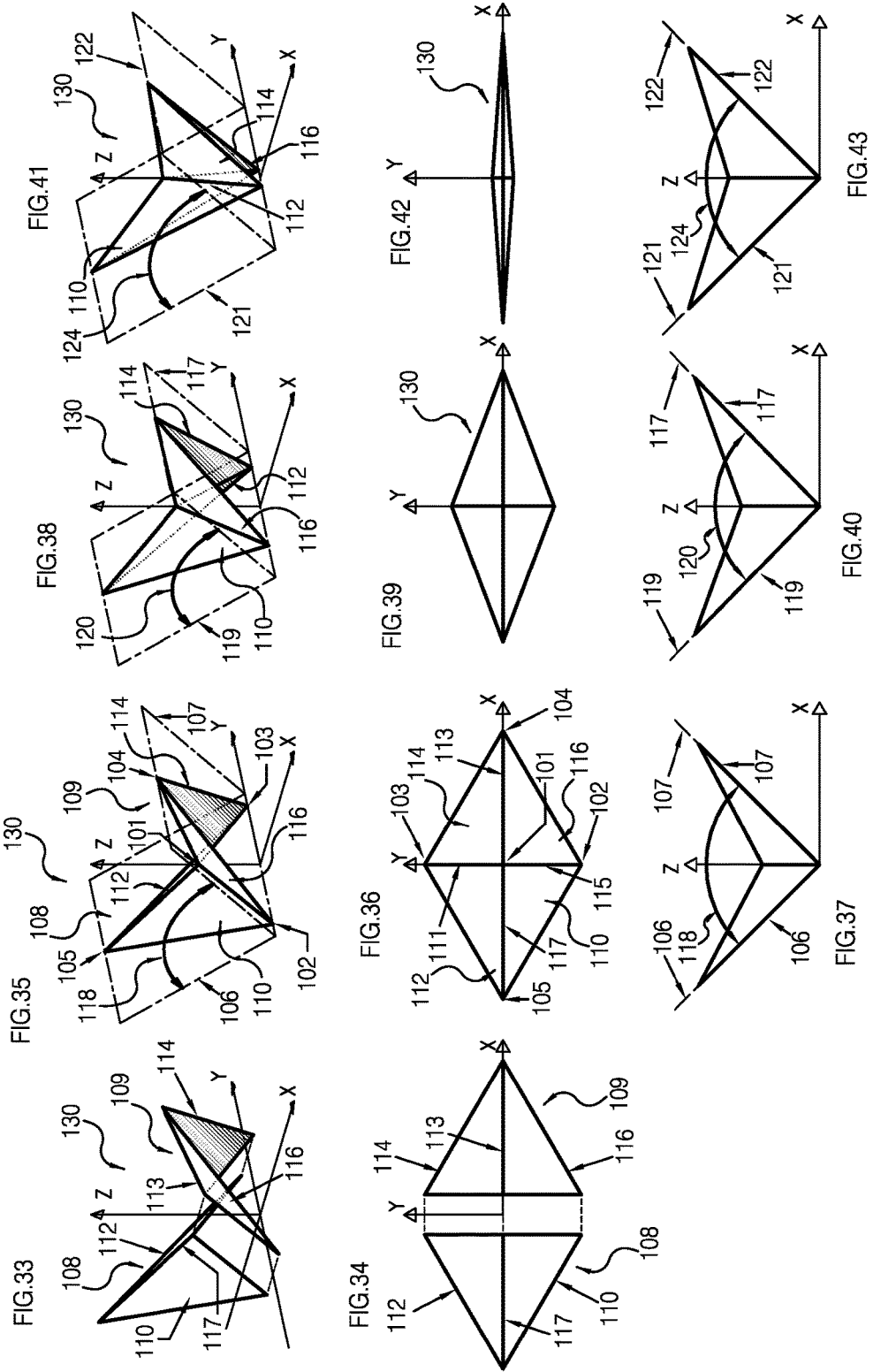

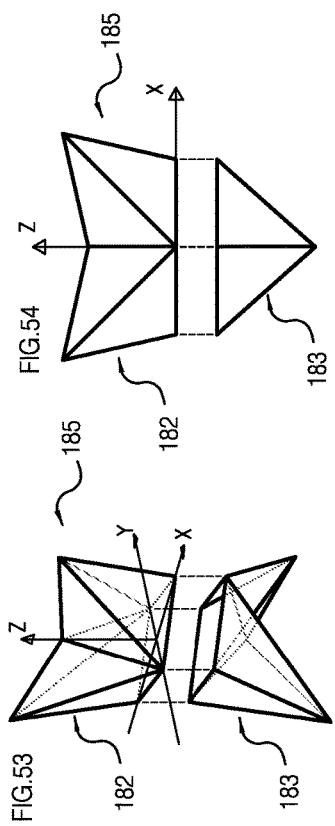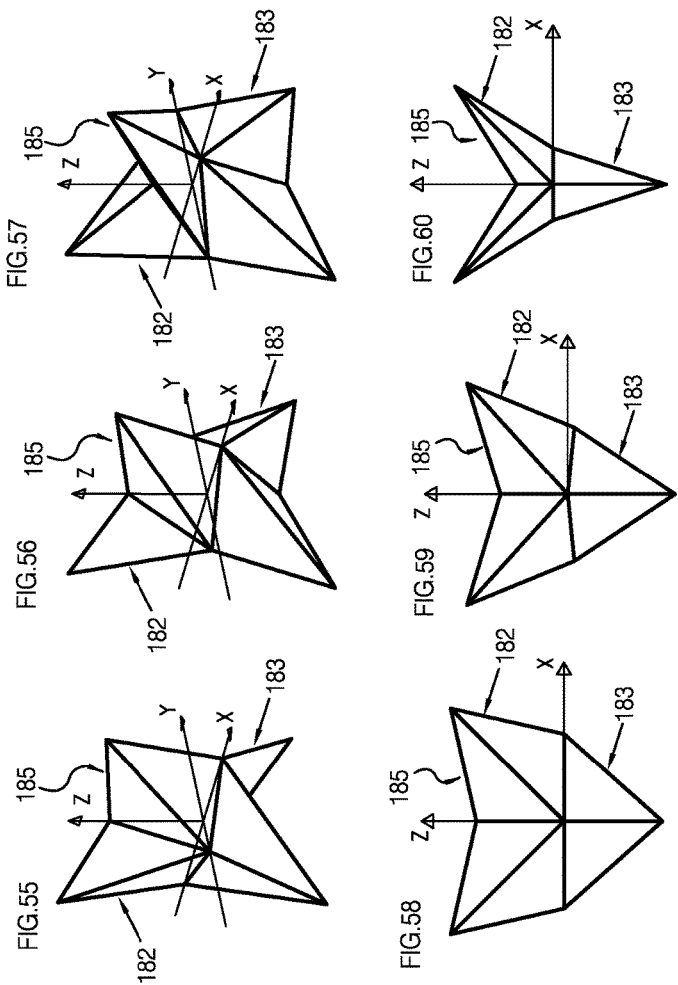

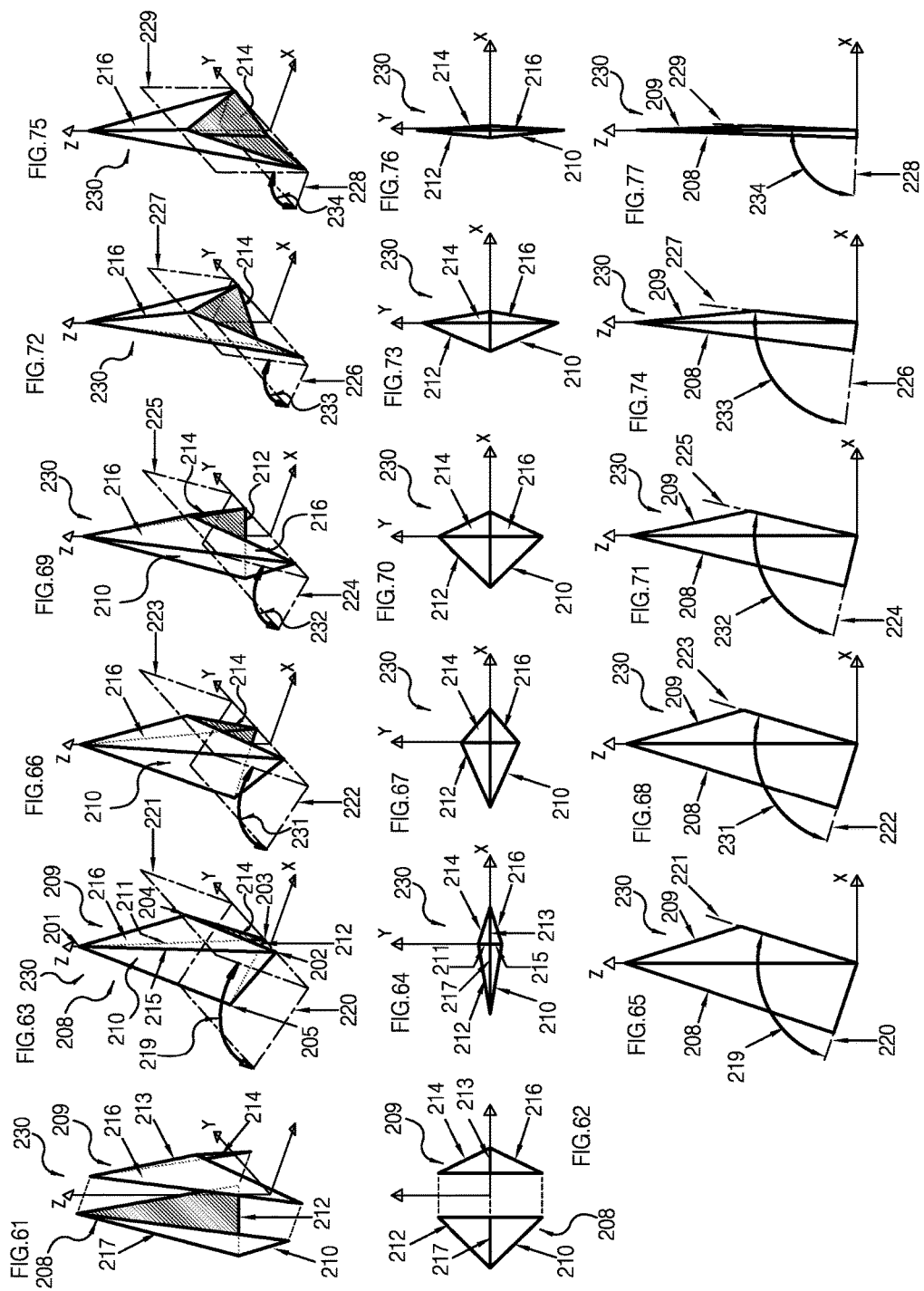

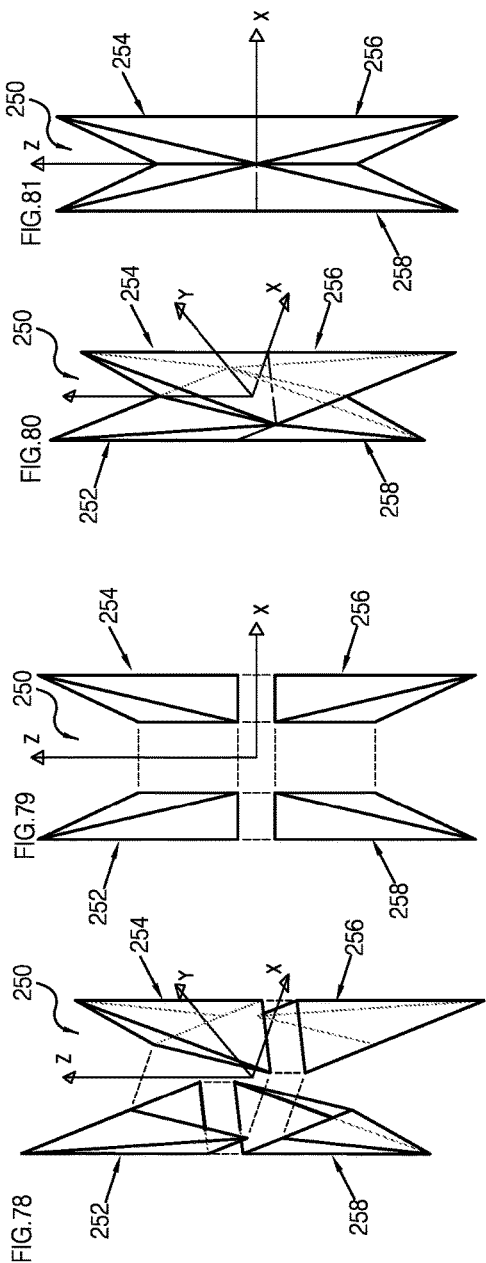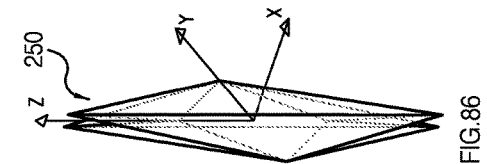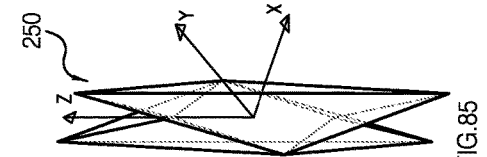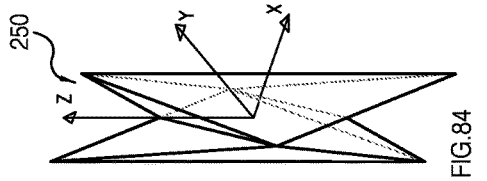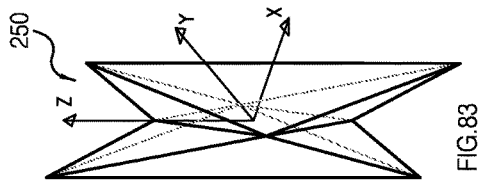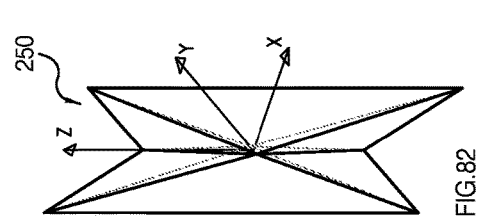

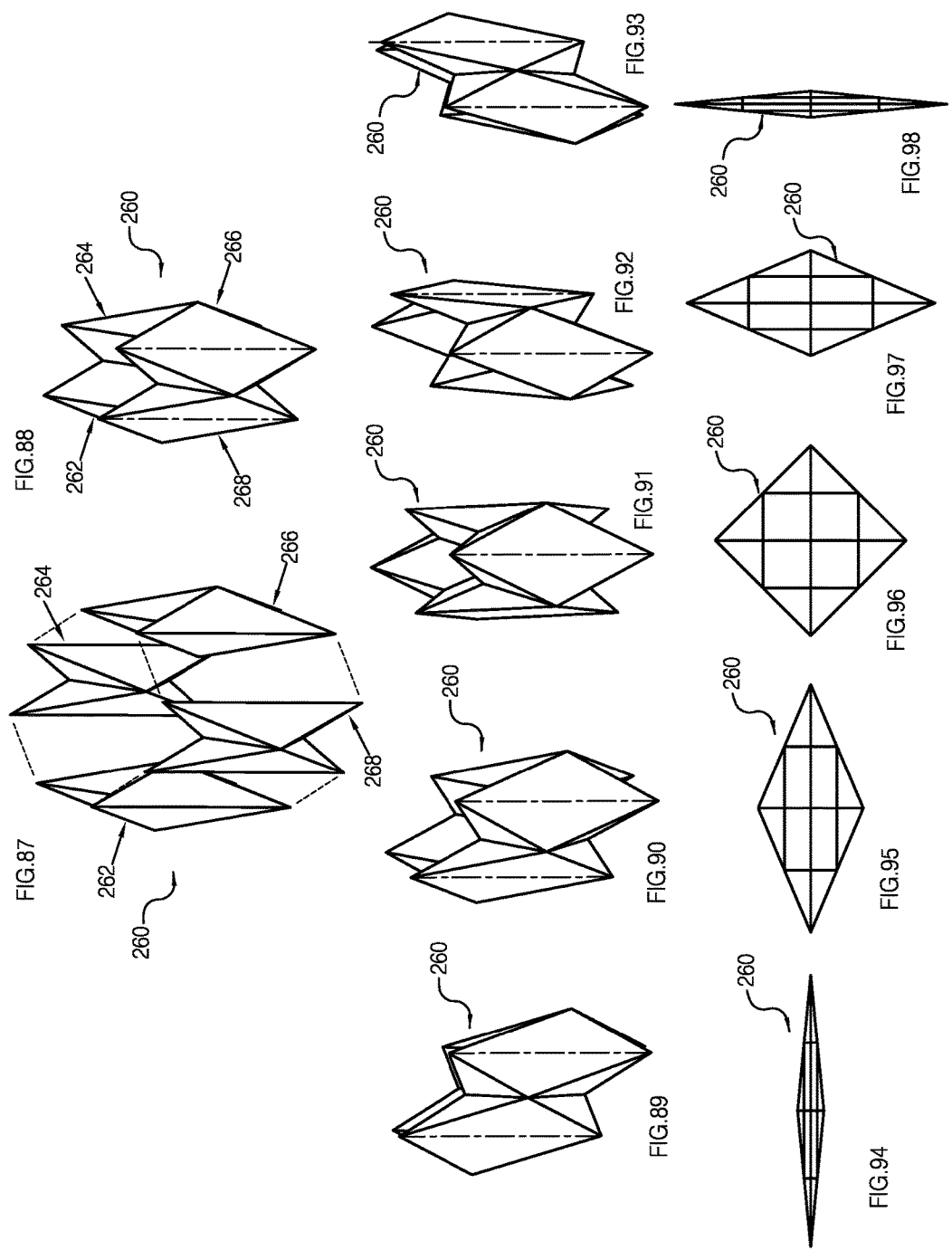

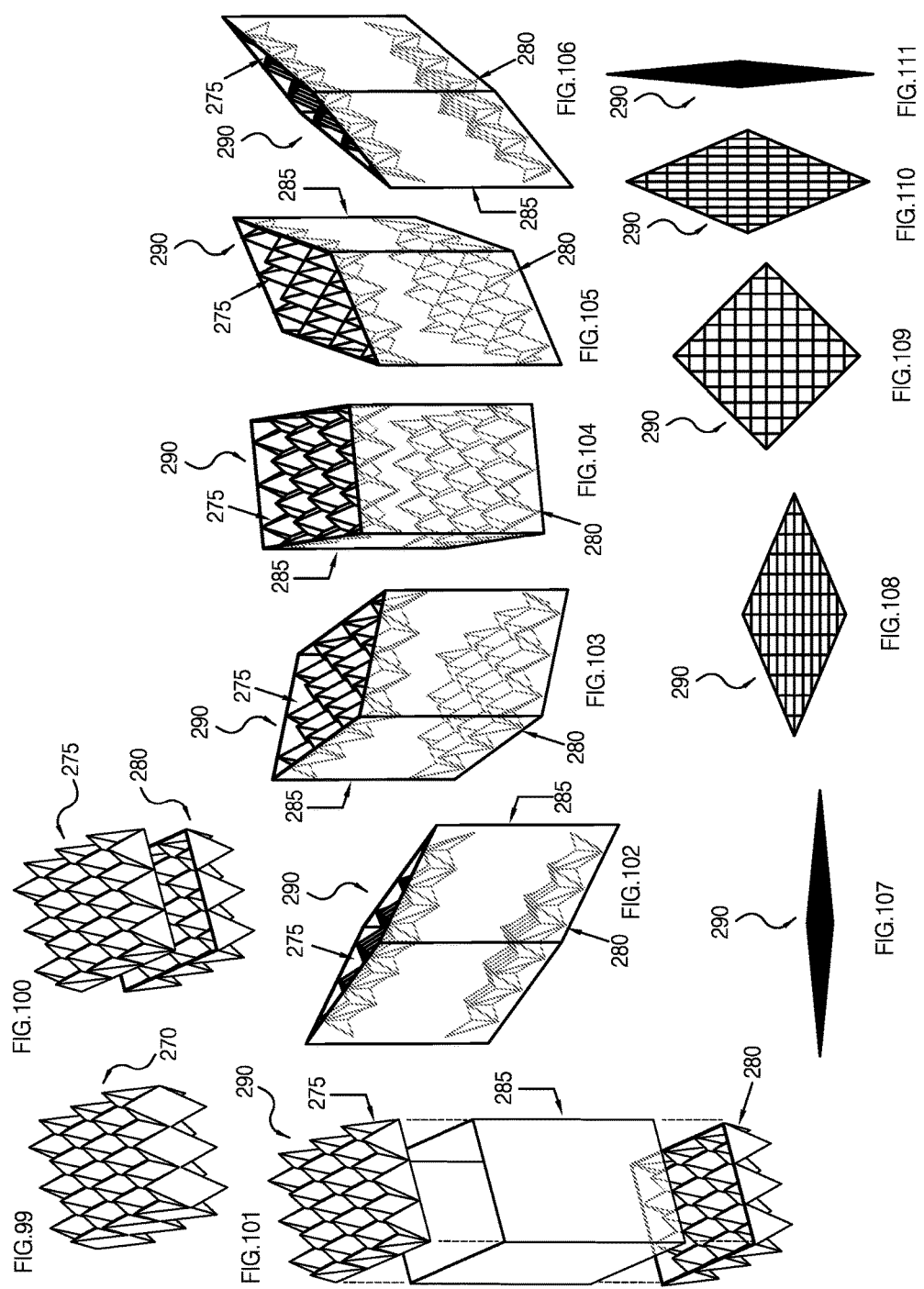

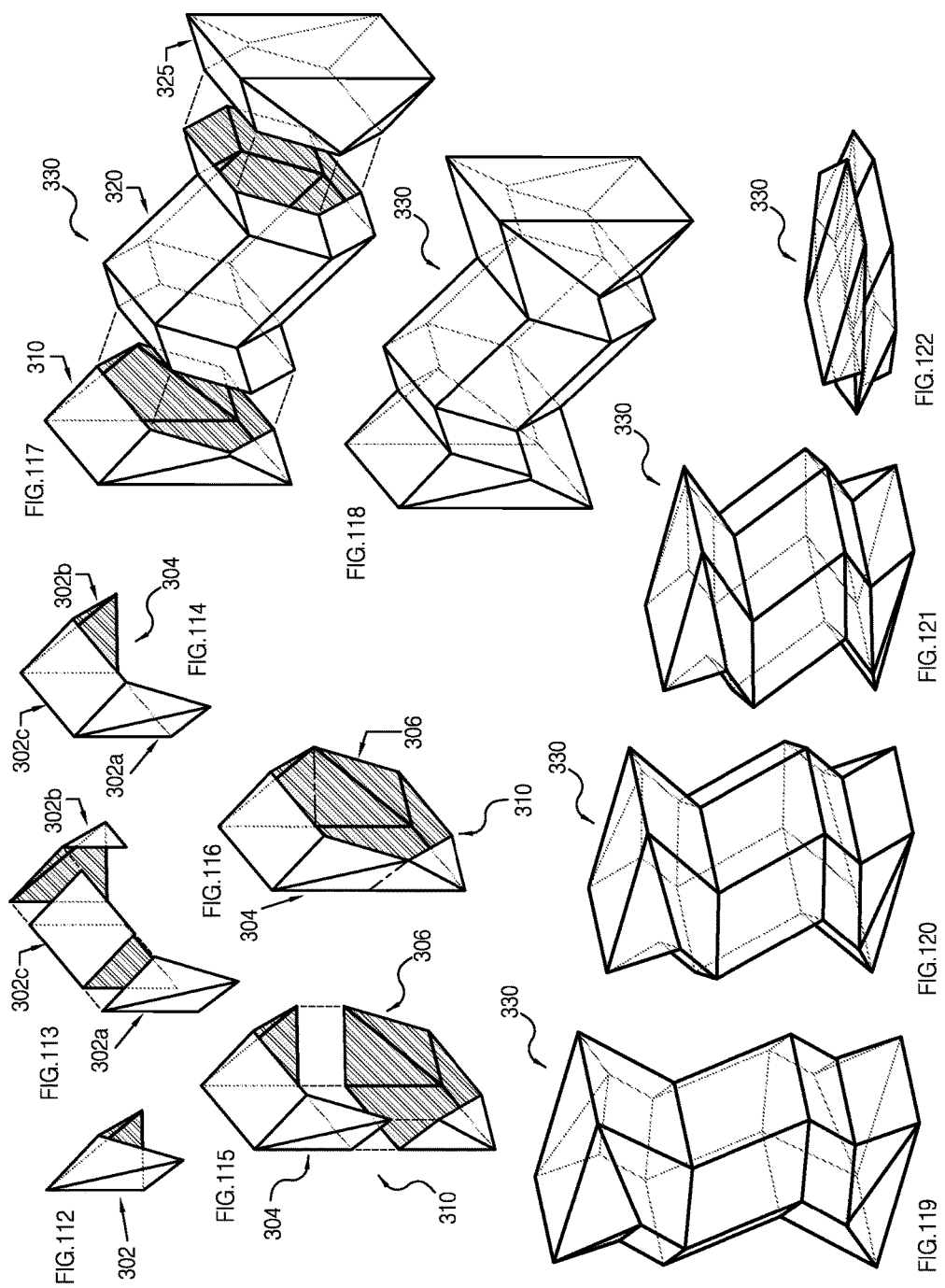

CONSTRUCTION METHOD FOR FOLDABLE POLYHEDRAL ENCLOSURES

CROSS-REFERENCE TO RELATED APPLICATIONS

This application claims benefit of U.S. Provisional Patent Application Ser. No. 62/355,483, entitled "CONSTRUCTION METHOD FOR FOLDABLE POLYHEDRAL ENCLOSURES" filed Jun. 28, 2016, the entirety of which is incorporated by reference herein.

BACKGROUND

Deployable structures have many functional applications such as quick-erect shelters, dynamic architectural elements and expandable structures for outer space.

In general, there are two types of deployable structures: those constructed of mechanical linkages, and those based on the folding principles of origami. Linkage-based structures are comprised of slender members connected by rotary pivots, while origami-based structures are comprised of planar facets that are joined along their edges by hinges. Unlike linkage-based structures, origami-based structures provide a continuous surface, which can be useful for areas such as coverings, display surfaces and enclosures.

There is growing interest in origami-based deployable structures. However, development is still at an early phase and challenges remain to finding practical solutions. Underlying these challenges are the rigorous constraints of origami design. The designer must ensure not only that the deployed structure meets performance requirements in terms of strength and shape, but that the deployment process—whether expanding, collapsing, or deforming in some other way—is reliable and well-controlled.

To date, a salient feature of deployable origami structures is that they are open surfaces, meaning that they have an unattached perimeter. Having an unattached perimeter is generally necessary in order for folding to occur. However, this edge is often structurally weak and tends to lose synchronization with the overall folding motion. To counter this tendency, the perimeter can be joined to external supports after deployment in order to stabilize the structure.

It has been generally perceived that open surfaces—as opposed to complete enclosures having no perimeter—is a necessary condition for folding to occur. In fact, there are rigorous conditions to achieve exact solutions for foldable enclosures (also termed "flexible polyhedra"). Most importantly the Bellows Conjecture* states that "the volume of a flexible polyhedron is invariant under flexing". This means that it is mathematically impossible to create a flexible polyhedron whose volume changes during the deformation process. [*The bellows conjecture was proved for a subset of polyhedra (I. Kh. Sabitov, 1995) and for the general case (Connelly, Sabitov, Walz, 1997).]

Mathematicians have painstakingly identified a very small number of constant-volume flexible polyhedra. It should be noted that these examples have complex construction, limited movement and are entirely impractical for real-world applications.

Nonetheless, it would be beneficial to create foldable shapes that are closed surfaces-complete enclosures with a definite inside and outside. By eliminating unsupported boundary conditions, such structures should achieve improved structural integrity. Closed shapes may also demonstrate improved mechanical movement, in an analogous manner to how closed kinematic chains (loops) are better synchronized than open chains. Beyond these technical issues, closed shapes offer potential solutions for applications such as packaging, industrial bellows and inflatable structures.

SUMMARY OF THE INVENTION

This invention is based on the discovery of a construction method to create closed-surface foldable structures. The method allows for a small degree of compliance in construction, such as hinges that are slightly loose (with mechanical free-play) or facets that are slightly bendable. This small degree of compliance allows for the design of myriad enclosures whose volume can change significantly as they fold and unfold thereby getting around the rigorous constraints represented by the Bellows Conjecture.

Structures made under this invention are thus well suited to be expanded using air pressure and represent a new class of inflatable structures. Standard inflatable structures are made are made entirely of soft materials. As a result, they are not well controlled during inflation/deflation. They require constant pressure to maintain their structural shape, and can fail catastrophically if ruptured. By contrast, structures made under this invention can be expanded and contracted repeatedly in a well-controlled manner, and remain structurally sound without requiring continuous pressure.

Accordingly, a foldable structure comprised of hinged panel segments is provided. These segments are comprised of a first panel pair comprised of a first and second polygonal panel, and a second panel pair comprised of a third and fourth polygonal panel. Segments are bounded by a first boundary plane defined by two sides of the first panel pair, and a second boundary plane defined by two sides of the second panel pair, Measurement of a boundary angle may be taken normal to the intersection of the first and second boundary planes. As the segment is continuously folded between a first position and a second position, said boundary angle remains substantially constant during folding.

Structures and assemblies comprised of said hinged panel segments are disclosed that remain complete enclosures during folding.

Therefore, an object of the invention is to provide an improved foldable structure.

Another objection of the invention is to provide a foldable structure which can be expanded and contracted repeatedly.

A further object of the invention is to provide a foldable structure that has closed surfaces.

Still, other objects and advantages will be apparent from the specification.

The invention comprises the features of construction, combination of elements and arrangement of parts, which will be exemplified in the construction hereinafter set forth.

The scope of the invention is set forth in the claims.

BRIEF DESCRIPTION

FIG. 1 shows a perspective view of panel segment 30 in exploded form.

FIG. 2 shows a plan view of panel segment 30 in exploded form.

FIG. 3 shows a perspective view of segment 30 in a first position.

Figure 26:
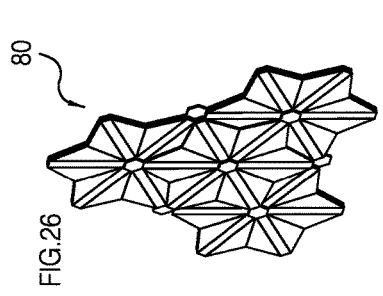

FIGS. 4 and 5 respectively show a plan and elevation of segment 30 in a first position.

FIGS. 6, 7 and 8 show segment 30 in a mid-position, in perspective, plan and elevation views respectively.

FIGS. 9, 10 and 11 show segment 30 in a final, flattened position, in perspective, plan and elevational views respectively.

FIGS. 12 and 13 shows foldable structure 50 in exploded form in elevational and perspective views respectively where structure 50 is comprised of six panel segments 42, 44, 46, 48, 50 and 52.

FIGS. 14, 15 and 16 show structure 50 in a first, mid and final position respectively, structure 50 maintaining a complete enclosure throughout.

FIGS. 17 and 18 shows foldable structure 70 in exploded form in elevational and perspective views respectively, where structure 50 is comprised of six panel segments 42, 44, 46, 48, 50 and 52 and six strip elements 55, 57, 59, 61, 63 and 65.

FIGS. 19, 20 and 21 show structure 70 in a first, mid and final position respectively, structure 70 maintaining a complete enclosure throughout.

Figure 22:
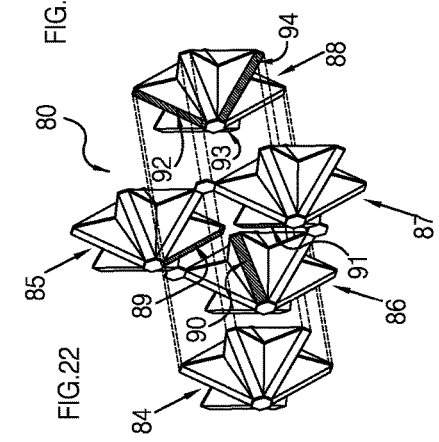

FIG. 22 shows foldable assembly 80 in exploded form in exploded form in perspective and plan views respectively, where structure 80 is comprised of foldable enclosures 84, 85, 86, 87 and 88.

Figure 23:
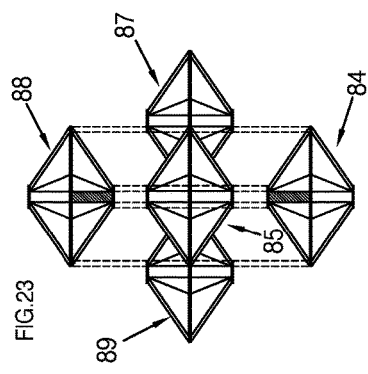

FIG. 23 shows a plan view of foldable structure assembly 80 in exploded form.

Figure 25:
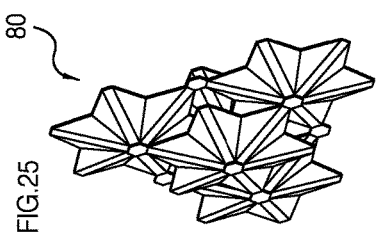
Figure 24:
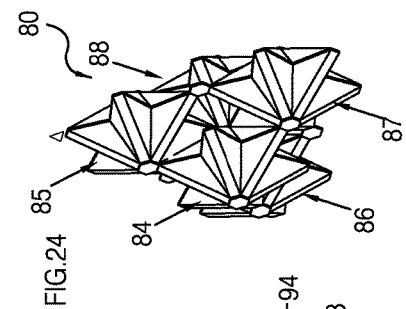

FIGS. 24, 25 and 26 show perspective views of assembly 80 in a first, mid and final position respectively, structure assembly 80 maintaining a complete enclosure throughout.

Figure 29:
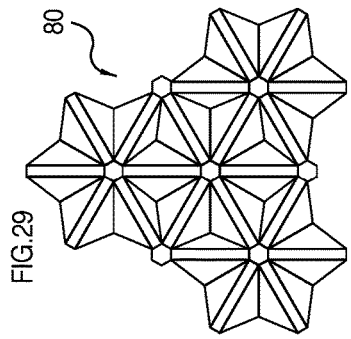
Figure 28:
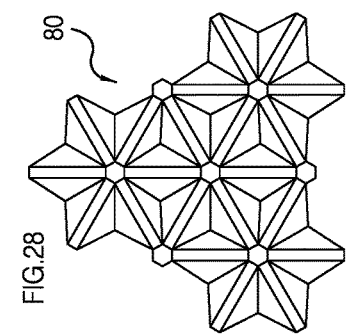
Figure 27:
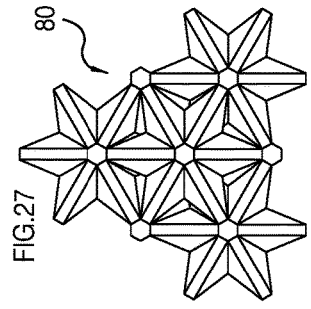

FIGS. 27, 28 and 29 show elevational views of assembly 80 in a first, mid and final position respectively.

Figure 32:
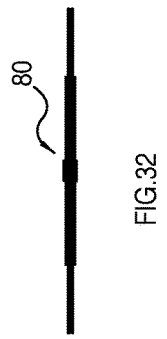
Figure 31:
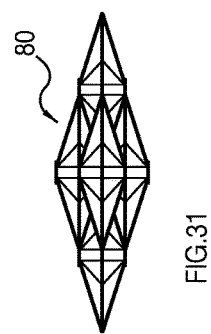
Figure 30:
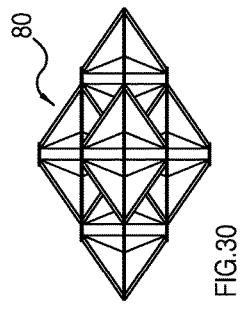

FIGS. 30, 31 and 32 show plan views of assembly 80 in a first, mid and final position respectively.

FIGS. 33 and 34 shows a perspective and plan views respectively of panel segment 130 in exploded form.

FIGS. 35, 36 and 37 show perspective, plan and elevational views of segment 130 in a first position.

FIGS. 38, 39 and 40 show perspective, plan and elevational views of segment 130 in a mid-position.

FIGS. 41, 42 and 43 show perspective, plan and elevational views of segment 130 in a final position.

Figure 44:
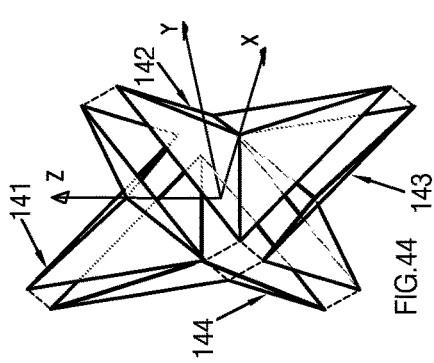

FIG. 44 shows foldable structure 140 in exploded form, where structure 140 is comprised of four panel segments.

Figure 47:
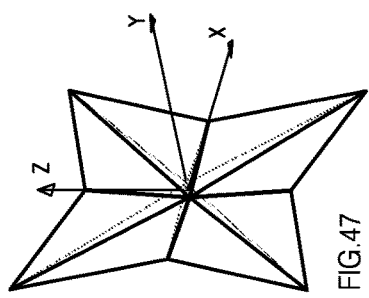
Figure 46:
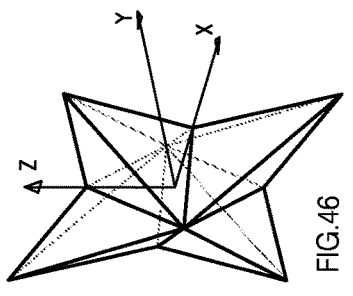
Figure 45:
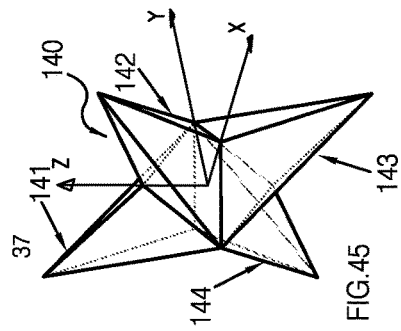

FIGS. 45, 46 and 47 shows structure 140 in a first, mid and final position respectively.

Figure 48:
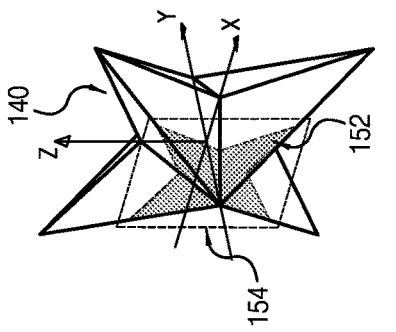

FIG. 48 shows structure 140 with a shaded portion 152.

Figure 50:
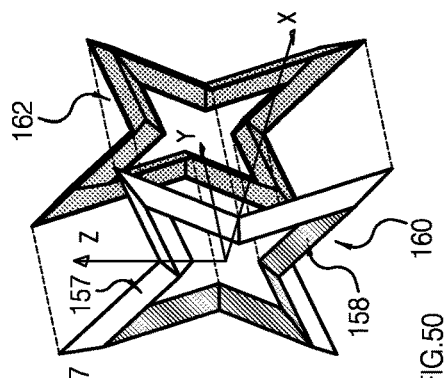
Figure 49:
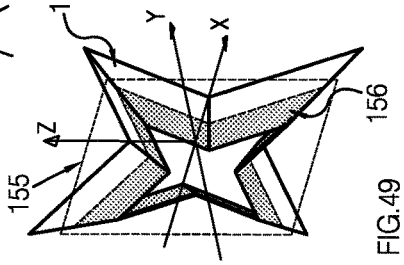

FIGS. 49 and 50 show structure 150 in a truncated and corrugated form respectively.

Figure 52:
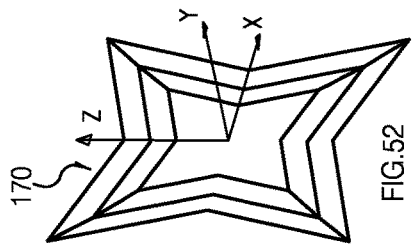
Figure 51:
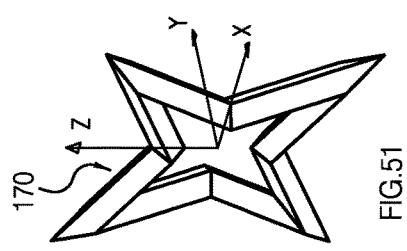

FIGS. 51 and 52 show structure 170 which is a tubular loop, in a first and final position respectively.

FIGS. 53 and 54 shows structure 185 in exploded form in a perspective and elevational view respectively.

FIGS. 55, 56 and 57 show perspective views of structure 185 in a first, middle and final position respectively.

FIGS. 58, 59 and 60 show elevational views of structure 185 in a first, middle and final position respectively.

FIGS. 61 and 62 shows a perspective and plan views respectively of panel segment 230 in exploded form.

FIGS. 63, 64 and 65 show perspective, plan and elevational views of segment 230 in a first position.

FIGS. 66, 67 and 68 show perspective, plan and elevational views of segment 230 in a second position.

FIGS. 69, 70 and 71 show perspective, plan and elevational views of segment 230 in a third position.

FIGS. 72, 73 and 74 show perspective, plan and elevational views of segment 230 in a fourth position.

FIGS. 75, 76 and 77 show perspective, plan and elevational views of segment 230 in a fifth, final position.

FIGS. 78 and 79 show perspective and elevational views respectively of foldable structure 250 in exploded form, where structure 250 is comprised of four segments 252, 254, 256 and 258.

FIGS. 80 and 81 show perspective and elevational views respectively of foldable structure 250.

FIGS. 82, 83, 84, 85 and 86 show perspective views of structure 250 in a first, second, third, fourth and final position respectively.

FIG. 87 shows a perspective view of foldable assembly 260 in exploded form.

FIG. 88 shows assembly 260 which is comprised of structures 262, 264, 266 and 268.

FIGS. 89, 90, 91, 92 and 93 show perspective views of assembly 260 in a first, second, third, fourth and final position respectively.

FIGS. 94, 95, 96, 97 and 98 show perspective views of assembly 260 in a first, second, third, fourth and final position respectively. FIGS. 94, 95, 96, 97 and 98 show plan views of assembly 260 in a first, second, third, fourth and final position respectively.

FIG. 99 shows a foldable assembly 270.

FIG. 100 shows foldable assembly 270 in exploded view.

FIG. 101 shows foldable assembly 290 in exploded form.

FIGS. 102, 103, 104, 105 and 106 show foldable assembly 290 in a first, second, third, fourth and fifth position respectively.

FIGS. 107, 108, 109, 110 and 111 show assembly 290 in plan view in a first, second, third, fourth and fifth position respectively.

FIG. 112 shows a foldable segment 302.

FIG. 113 shows segment 302 in exploded view.

FIG. 114 shows foldable segment 304.

FIGS. 115 and 116 shows foldable structure 310 in exploded form and attached form respectively.

FIGS. 117 and 118 shows foldable assembly 330 in exploded form and attached form respectively.

FIGS. 119, 120, 121 and 122 show assembly 330 in a first, second, third and fourth position respectively.

DETAILED DESCRIPTION

FIG. 1 shows a perspective view of panel segment 30 in exploded form. Segment 30 is comprised of two panel pairs 8 and 9. Panel pair 8 is comprised of panels 10 and 12; panel 9 is comprised of panels 14 and 16.

FIG. 2 shows a plan view of panel segment 30 in exploded form. Within panel pair 8, panel 10 is connected to panel 12 by hinge 17. Panels 10 and 12 are mirror images to each other. Similarly, within panel pair 9, panel 16 is connected to panel 14 by hinge 13. Panels 16 and 14 are mirror images to each other.

FIG. 3 shows a perspective view of segment 30 in a first position consisting of panels 10, 12, 14 and 16. Panel pairs 8 and 9 are attached by hinges 11 and 15. Panel pair 8 has unattached edges along points 2, 5 and 3, defining boundary plane 6. Panel pair 7 has unattached edges along points 2, 4 and 3, defining boundary plane 7. Boundary planes 6 and 7 form angle 18, which lies parallel to the X-Z plane.

FIG. 4 shows a plan view of segment 30. Panels 10, 12 are attached by hinge 17; panels 12, 14 are attached by hinge 11, panels 14, 16 are attached by hinge 13; panels 16, 10 are attached by hinge 15. Hinges 11, 13, 15 and 17 intersect at point 1. Segment 30 has a mirror-wise symmetry along hinges 13 and 17.

Segment 30 is a spherical four-bar linkage, defined as four planar panels attached together by four intersecting hinge lines. As with all spherical four bar linkages, segment 30 has a single degree of freedom.

FIG. 5 shows segment 30 in elevational view. Angle 18 may be seen to span the edges of segment 30 in this view.

FIG. 6 shows segment 30 in a mid-position where panels 10, 16 have moved towards a more flattened position relative to panels 12, 14. Boundary planes 19 and 20 bound segment 30, and form angle 24. FIGS. 7 and 8 show plan and elevational views of segment 30 in a mid-position respectively.

FIG. 9 shows segment 30 in a final position where panels 10, 16 are in a flattened position relative to panels 12, 14. Boundary planes 21 and 22 bound segment 30, and form angle 25. FIGS. 10 and 11 show plan and elevational views of segment 30 in final, flattened position respectively.

Boundary angles 18, 24 and 25 as shown in FIGS. 5, 8 and 11 respectively remain substantially constant as segment 30 is folded.

FIG. 12 shows an elevational view of foldable structure 50 in exploded form. Structure 50 is comprised of six panel segments 42, 44, 46, 48, 50 and 52. FIG. 13 shows a perspective view of structure 50 in exploded form.

FIG. 14 shows foldable structure 50 in a first position wherein segment 42 is hingedly joined to segments 44, 52. In a similar fashion, segments 44, 46, 48, 50 and 52 are joined to their neighboring segments. Structure 50 is a completely enclosed volume.

FIGS. 15 and 16 show structure 50 in a mid-position and final flattened position respectively, maintaining a complete enclosure throughout.

FIG. 17 shows an elevational view of foldable structure 70 in exploded form. Structure 70 is comprised of six panel segments 54, 56, 58, 60, 62, six strip elements 55, 57, 59, 61, 63 and 65, and a hexagonal center element 66. FIG. 18 shows a perspective view of structure 70 in exploded form.

FIG. 19 shows foldable structure 70 in a first position wherein segment 56 is hingedly joined to strip elements 55 and 57. In a similar fashion, segments 54, 56, 58, 60 and 62 are joined to their neighboring strip segments 55, 57, 59, 61, 63 and 65 respectively which are in turn joined to center element 66. Structure 70 is a completely enclosed volume.

FIGS. 20 and 21 show structure 70 in a mid-position and final flattened position respectively maintaining a complete enclosure throughout.

FIG. 22 shows a perspective view of foldable structure assembly 80 in exploded form. Assembly 80 is comprised of foldable enclosures 84, 85, 86, 87 and 88. Enclosure 84 is aligned to enclosures 85, 86 and 87 along shaded strip elements 89, 90, 91. Enclosures 85, 86 and 87 are aligned to enclosure 88 along shaded strip elements 92, 93 and 94. FIG. 23 shows a plan view of foldable structure assembly 80 in exploded form.

FIG. 24 shows a perspective view of foldable structure assembly 80 in a first position where foldable enclosures 84, 85, 86, 87 and 88 are attached together. FIGS. 25 and 26 show foldable structure assembly 80 in a mid-position and final flattened position respectively.

FIGS. 27, 28 and 29 show an elevational view of foldable structure assembly 80 in a first, middle and final position respectively.

FIGS. 30, 31 and 32 show a plan view of foldable structure assembly 80 in a first, middle and final position respectively FIG. 33 shows a perspective view of panel segment 130 in exploded form. Segment 130 is comprised of two panel pairs 108 and 109. Panel pair 108 is comprised of panels 110 and 112; panel 109 is comprised of panels 114 and 116.

FIG. 34 shows a plan view of panel segment 130 in exploded form. Within panel pair 108, panel 110 is connected to panel 112 by hinge 117. Panels 110 and 112 are mirror images to each other. Similarly, within panel pair 109, panel 116 is connected to panel 114 by hinge 113. Panels 116 and 114 are mirror images to each other.

FIG. 35 shows a perspective view of segment 130 in a first position. Segment 130 consists of panels 110, 112, 114 and 116. Panel pairs 108 and 109 are attached by hinges 111 and 115. Panel pair 108 has unattached edges along points 102, 105 and 103, defining boundary plane 106. Panel pair 107 has unattached edges along points 102, 104 and 103, defining boundary plane 107. Boundary planes 106 and 107 form angle 118, which lies parallel to the X-Z plane.

FIG. 36 shows a plan view of segment 130. Panels 110, 112 are attached by hinge 117; panels 112, 114 are attached by hinge 111, panels 114, 116 are attached by hinge 113; panels 116, 110 are attached by hinge 115. Hinges 111, 113, 115 and 117 intersect at point 101. Segment 130 has a mirror-wise symmetry along hinges 113 and 117.

FIG. 37 shows an elevational view of segment 130. Boundary planes 106 and 107 form an angle 118 lying parallel to the X-Z plane.

FIG. 38 shows segment 130 in a mid-position where panels 110, 116 have moved towards a more flattened position relative to panels 112, 114. Boundary planes 117 and 119 bound segment 130, and form angle 120. FIGS. 39 and 40 show plan and elevational views respectively of segment 130 in a mid-position respectively.

FIG. 41 shows segment 130 in a final position where panels 110, 116 are in a flattened position relative to panels 112, 114. Boundary planes 121 and 122 bound segment 130, and form angle 124. FIGS. 42 and 43 show plan and elevational views of segment 130 in final, flattened position respectively.

Boundary angles 118, 124 and 125, as shown in FIGS. 37, 40 and 43, respectively remain substantially constant as segment 130 is folded.

FIG. 44 shows a perspective view of foldable structure 140 in exploded form. Structure 140 is comprised of four panel segments 141, 142, 143 and 144.

FIG. 45 shows foldable structure 140 in a first position wherein segment 142 is hingedly joined to segments 141 and 143. In a similar fashion, segments 141, 143, 144 are joined to their neighboring segments. Structure 140 is a completely enclosed volume. FIGS. 46 and 47 show structure 140 in a mid-position and flattened final position respectively.

FIG. 48 shows structure 140 in a first position, with a shaded portion 152 that is defined by intersecting plane 154.

FIG. 49 shows surface 150, which is now truncated due to the removal of portion 152. Surface 150 is shown with a shaded portion 156, and a non-shaded portion 157, each defined by intersecting plane 155.

FIG. 50 shows corrugated surface 160 wherein portion 156 has been popped inwards into a mirrored position relative to its position in FIG. 49. Further shown in FIG. 50 is corrugated surface 162 which is a mirror image of structure 160.

FIG. 51 shows foldable structure 170 in a first position wherein surfaces 160 and 162 have been joined along their perimeters. Structure 170 forms a tubular loop and is an enclosed volume. FIG. 52 shows structure 170 in a final flattened position.

FIG. 53 shows a perspective view of structure 185 in exploded form. Structure 185 is comprised of panel segments 182 and 183. Segments 182 and 183 are similar to each other, and are oriented at 90 degrees to each other around the Z axis. FIG. 54 shows structure 185 in elevational view.

FIGS. 55, 56 and 57 show perspective views of structure 185 in a first, mid and final position respectively. Structure 185 is an enclosed volume. FIGS. 58, 59 and 60 show elevational views of structure 185 in a first, mid and final position respectively.

FIG. 61 shows a perspective view of panel segment 230 in exploded form. Segment 230 is comprised of two panel pairs 208 and 209. Panel pair 208 is comprised of panels 210 and 212; panel 209 is comprised of panels 214 and 216.

FIG. 62 shows a plan view of panel segment 230 in exploded form. Within panel pair 208, panel 210 is connected to panel 212 by hinge 217. Panels 210 and 212 are mirror images to each other. Similarly, within panel pair 209, panel 216 is connected to panel 214 by hinge 213. Panels 216 and 214 are mirror images to each other.

FIG. 63 shows a perspective view of segment 230 in a first position. Segment 230 consists of panels 210, 212, 214 and 216. Panel pairs 208 and 209 are attached by hinges 211 and 215. Panel pair 208 has unattached edges along points 202, 205 and 203, defining boundary plane 220. Panel pair 209 has unattached edges along points 202, 204 and 203, defining boundary plane 221. Boundary planes 220 and 221 form angle 219, which lies parallel to the X-Z plane.

FIG. 64 shows a plan view of segment 230. Panels 210, 212 are attached by hinge 217; panels 212, 214 are attached by hinge 211, panels 214, 216 are attached by hinge 213; panels 216, 210 are attached by hinge 215. Hinges 211, 213, 215 and 217 intersect at point 201. Segment 230 has a mirror-wise symmetry along hinges 213 and 217.

FIG. 65 shows segment 230 in elevational view. Angle 219 spans boundary planes 220 and 221.

FIG. 66 shows a perspective view of segment 230 in a second position. Planes 222 and 223 bound segment 230, forming angle 231. FIGS. 67 and 68 respectively show plan and elevational views of segment 230 in its second position.

FIG. 69 shows a perspective view of segment 230 in a third position. Planes 224 and 225 bound segment 230, forming angle 232. FIGS. 70 and 71 respectively show plan and elevational views of segment 230 in its third position.

FIG. 72 shows a perspective view of segment 230 in a fourth position. Planes 226 and 227 bound segment 230, forming angle 233. FIGS. 73 and 74 respectively show plan and elevational views of segment 230 in its fourth position.

FIG. 75 shows a perspective view of segment 230 in a fifth, final position. Planes 228 and 229 bound segment 230, forming angle 234. FIGS. 76 and 77 respectively show plan and elevational views of segment 230 in its final position.

Boundary angles 219, 231, 232, 233 and 234 and 125 as shown in FIGS. 65, 68, 71, 74 and 77 respectively remain substantially constant as segment 230 is folded.

FIG. 78 shows a perspective view of foldable structure 250 in exploded form. Structure 250 is comprised of four segments 252, 254, 256 and 258. FIG. 79 shows an elevational view of structure 250 in exploded form.

FIG. 80 shows a perspective view of foldable structure 250 where segments 252, 254, 256 and 258 have been attached to their neighbors. FIG. 81 shows an elevational view of foldable structure 250.

FIGS. 82, 83, 84, 85 and 86 show perspective views of structure 250 in a first, second, third, fourth and final position respectively.

FIG. 87 shows a perspective view of foldable assembly 260 in exploded form. Assembly 260 is comprised of structures 262, 264, 266 and 268. FIG. 88 shows assembly 260 where structures 262, 264, 266 and 268 have been attached to their neighbors.

FIGS. 89, 90, 91, 92 and 93 show perspective views of assembly 260 in a first, second, third, fourth and final position respectively. FIGS. 94, 95, 96, 97 and 98 show plan views of assembly 260 in a first, second, third, fourth and final position respectively. In these views, it may be seen that assembly 260 provides a continuous infill to a folding parallelogram.

FIG. 99 shows a foldable assembly 270 comprised of a multiplicity of foldable segments.

FIG. 100 shows foldable assembly 270 in exploded view having been separated into an first half 275 and a second half 280.

FIG. 101 shows foldable assembly 290 in exploded form. Assembly 290 is comprised of first half 275, second half 280 and foldable parallelogram 285.

FIG. 102 shows foldable assembly 290 in a first position wherein upper half 275 and lower half 280 are hingedly attached to foldable parallelogram 285. FIGS. 103, 104, 105 and 106 show foldable assembly 290 in a second, third, fourth and fifth position respectively. Assembly 290 remains a complete enclosure throughout the process of folding.

FIGS. 107, 108, 109, 110 and 111 show assembly 290 in plan view in a first, second, third, fourth and fifth position respectively. In these views it may be seen that assembly 290 provides a continuous infill to a folding parallelogram.

FIG. 112 shows a foldable segment 302. FIG. 113 shows segment 302 in exploded view having been separated into a first half 302*a* and second half 302*b*, along with a spacer 302*c* lying between them.

FIG. 114 shows foldable segment 304 wherein 302*a*, 302*b* and 302*c* have been hingedly attached to one another.

FIG. 115 shows foldable structure 310 in exploded view, which is comprised of foldable segments 304 and 306. FIG. 116 shows structure 310 wherein segments 304 and 306 have been attached to each other.

FIG. 117 shows foldable assembly 330 in exploded view. Assembly 330 is comprised of three foldable structures 310, 320 and 330. FIG. 118 shows assembly 330 wherein structures 310, 320 and 330 have been attached to each other.

FIGS. 119, 120, 121 and 122 show assembly 330 in a first, second, third and fourth position respectively. Assembly 330 remains a complete enclosure throughout the process of folding.

While there has been described what are at present considered to be the preferred embodiments of the present invention, it will be apparent to those skilled in the art that the embodiments described herein are by way of illustration and not of limitation. Various modifications of the disclosed embodiments, as well as alternative embodiments of the invention, will become apparent to persons skilled in the art upon reference to the description of the invention. Therefore, it is to be understood that various changes and modifications may be made in the embodiments disclosed herein without departing from the true spirit and scope of the present invention, as set forth in the appended claims, and it is contemplated that the appended claims will cover any such modifications or embodiments.

The invention claimed is:
1. A foldable structure comprising;
   a plurality of hinged panel segments wherein each said segment includes a first and second pair of panels;
   said first panel pair of each said segment comprising first and second polygonal shaped panels, each of said first and second panels having first, second and third sides, said first and second panels being hingedly attached to each other along said first sides thereof in order to define a first shared edge, said first and second panels of each said segment being mirror images of each other;

said second panel pair of each said segment comprising third and fourth polygonal shaped panels, each of said third and fourth panels having first, second and third sides, said third and fourth panels being hingedly attached to each other along said first sides thereof in order to define a second shared edge, said third and fourth panels of each said segment being mirror images of each other;

said first and third panels of each said segment being hingedly attached to each other along said second sides thereof in order to define a third shared edge and said second and fourth panels being hingedly attached to each other along said second sides thereof in order to define a fourth shared edge;

wherein said first, second, third and fourth panels of each said segment share a common vertex at the intersection of said first, second, third and fourth shared edges;

wherein a first boundary plane is defined by said third side of each of said first and second panels of each said segment, and a second boundary plane is defined by said third side of each of said third and fourth panels of each said segment;

wherein a boundary angle is measured normal to the intersection of the first and second boundary planes; and wherein each said panel segment of said foldable structure is continuously foldable between a first position and a second position without disassembly such that said boundary angle remains substantially constant during folding.

2. A foldable structure according to claim 1, wherein the structure is a complete enclosure.

3. A foldable structure according to claim 1, wherein at least one of said segments is further defined by a spacer element that is hingedly connected between said corresponding first and second panels.

4. A foldable assembly comprised of a plurality of foldable structures according to claim 1, wherein said structures are attached to each other.

5. A foldable assembly according to claim 4, wherein openings exist between adjacent structures so that a continuous enclosed volume is defined over the entire assembly.

6. A foldable assembly according to claim 4, wherein said assembly provides a continuous infill to a folding parallelogram.

7. A foldable structure according to claim 1, wherein the structure can be expanded and contracted repeatedly.

8. The foldable structure according to claim 7, wherein said structure is expandable by means of inflation.

9. The foldable structure according to claim 7, wherein said structure is contractible by means of deflation.

* * * * *